July 19, 1949.  H. R. DREHER  2,476,588
METHOD OF MAKING LINED BRAKE SHOES
Filed Feb. 9, 1944  2 Sheets-Sheet 1

INVENTOR
Hedley R. Dreher
BY
Spencer Hardman Fehr
his ATTORNEYS

July 19, 1949.  H. R. DREHER  2,476,588
METHOD OF MAKING LINED BRAKE SHOES
Filed Feb. 9, 1944  2 Sheets-Sheet 2
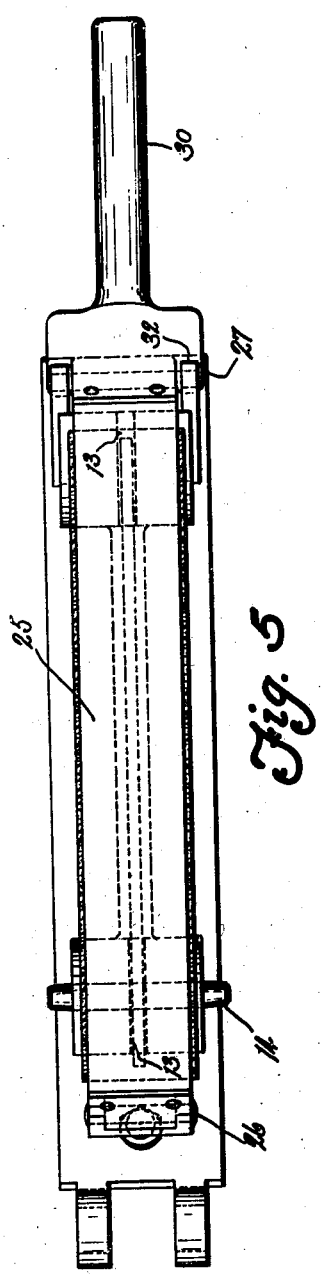
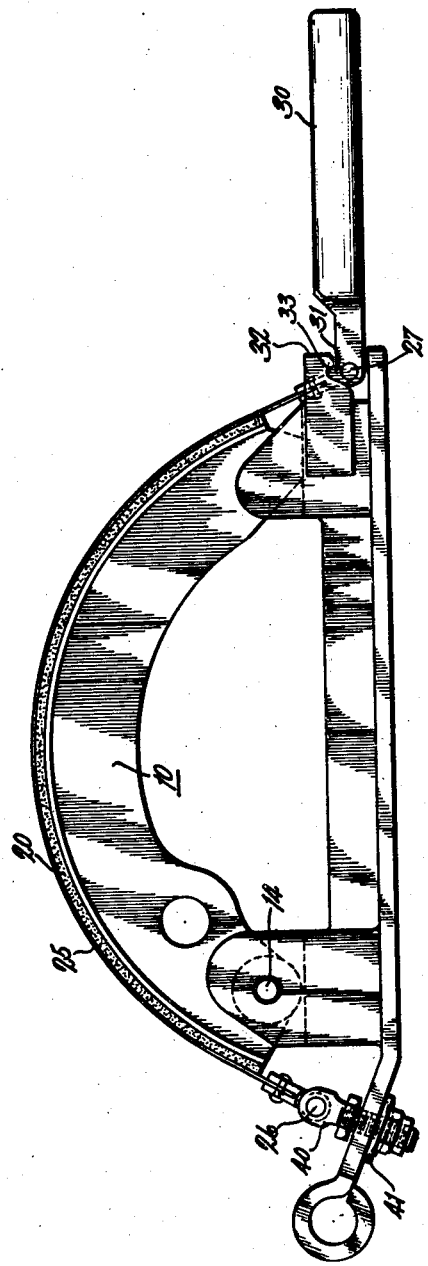
INVENTOR
Hedley R. Dreher
BY
Spencer Hardman & Fehr
his ATTORNEYS Patented July 19, 1949

2,476,588

UNITED STATES PATENT OFFICE 2,476,588

METHOD OF MAKING LINED BRAKE SHOES

Hedley R. Dreher, Huntington, Ind., assignor to General Motors Corporation, Detroit, Mich., a corporation of Delaware Application February 9, 1944, Serial No. 521,655

6 Claims. (Cl. 154—81)

This invention relates to lined brake shoes and method of making same.

In attaching molded brake linings to brake shoes it is customary to rivet the lining to the face of the brake shoe by countersinking the rivet heads some distance below the wearing surface of the lining. Such riveting has various disadvantages, for instance: (1) the lining must be replaced as soon as its thickness wears down to permit any of the metal rivets to contact the brake drum, (2) the lining is fixed to the metal shoe only at the spaced rivets and therefore the lining is subject to developing high spots or a general unevenness, which tends to cause noise, chattering or grabbing brakes, and which in any event prevents utilization of the full available braking area of the lining, (3) the brake lining is not rigidly fixed over its entire area to its underlying supporting metal surface and hence there is nothing to insure an evenly-supported uniformly-curved wearing surface after a period of use, (4) the brake shoe must be so designed and drilled as to accommodate the riveting of the lining thereto, (5) grit or other foreign matter gets into the open counterbole holes in the lining and abrades the metal brake drums, or otherwise interferes with normal braking action.

In order to overcome the above mentioned disadvantages of riveted-on brake linings it has been heretofore proposed to ond a molded brake lining directly to its supporting metal surface. However so far as known such proposed devices have not been adopted by the automotive industry, due to various inherent defects therein or due to difficulties or excessive costs in making same.

The general object of this invention is to provide an improved method of making a lined brake shoe having a molded friction lining strongly bonded directly to a metal brake shoe.

By my invention a moldable thermosetting friction compound is first hot-molded into a straight flat lining but the thermosetting binder therein is only partially cured to such a limited degree as will still permit the lining being bent into the desired arcuate form and subject to a more complete setting-up cure after being so bent. This straight and only partially cured lining is subsequently curved and pressed into face to face contact with a resin-coated curved face of the brake shoe and these parts, while so clamped together, are baked at such temperature and for such time period as will complete the setting-up and hardening of the lining while in its final curved form. The heat and pressure of this final cure is utilized to cause the resin coating on the brake shoe to first soften and be pressed into a more intimate welding relationship with the still incompletely cured binder in the friction lining and into a more intimate relationship with the metal face of the brake shoe, and then immediately set up under the applied heat and pressure and thereby strongly bond the friction lining to said metal face. If desired, the metal face of the brake shoe may be roughened (as by sand-blasting or shot-blasting) prior to being given the thin adhering coating of thermosetting resin, in order to increase the final resin-to-metal bond between the metal brake shoe and the brake lining.

Further objects and advantages of the present invention will be apparent from the following description.

In the drawings, Fig. 1 is a side elevation of a metal automobile brake shoe with the friction lining strongly bonded thereto according to this invention. Fig. 2 is a section on line 2—2 of Fig. 1, and attempts to show by short diagonal lines how the thin bonding coating of resin on the brake shoe slightly permeates or flows into a more intimate welding relationship with the binder resin in the friction lining, as described hereinafter.

Fig. 4 illustrates the parts shown in Fig. 3 but with the friction lining flexed and forced into exact conformity with the convex face of the brake shoe and very tightly clamped thereupon with a uniformly distributed pressure by means of the yielding high tension in the steel band, as described hereinafter.

Fig. 5 is a plan view of Fig. 4.

Figure 1:
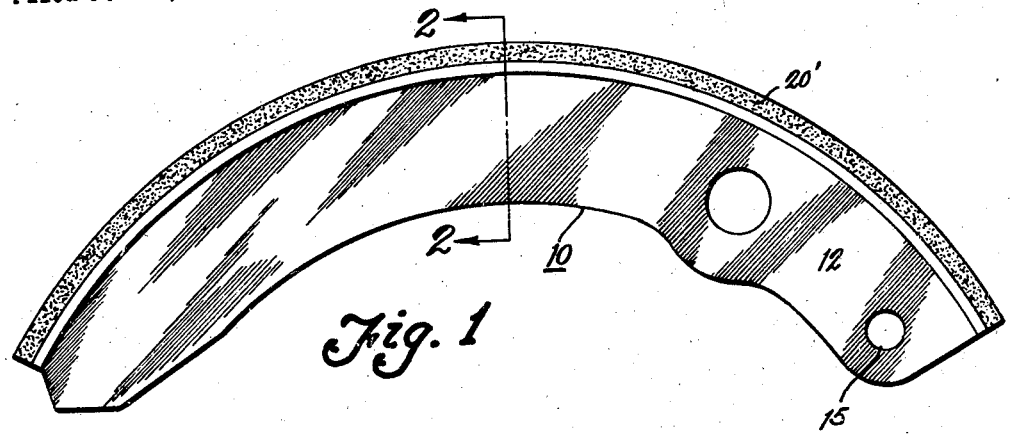
Figure 2:
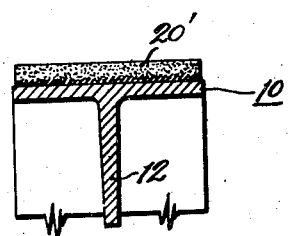
Figure 3:
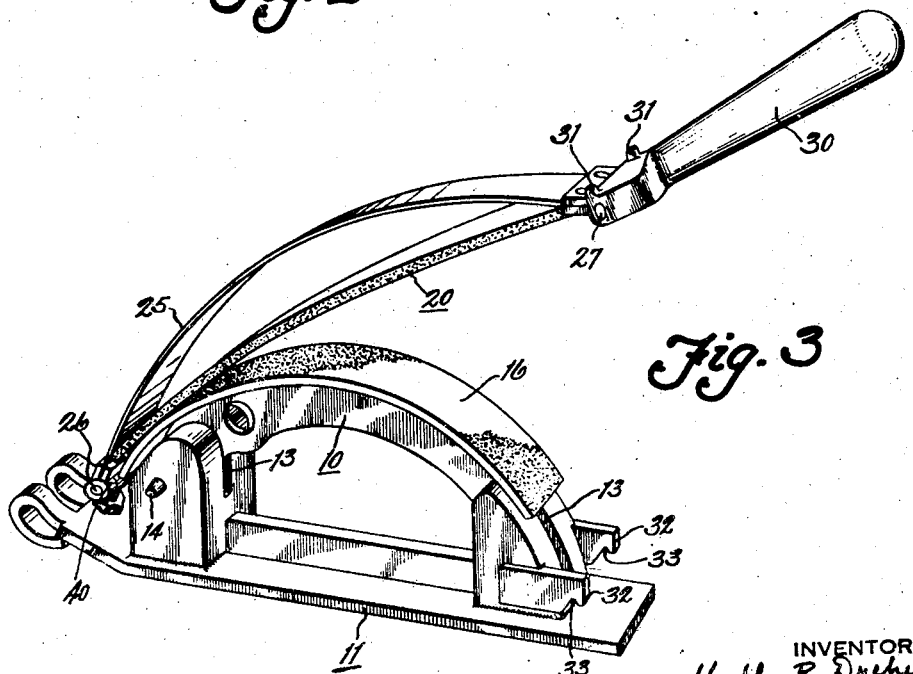
Fig. 3 illustrates the portable baking form with the brake shoe properly located in place therein, and with the flexible semi-cured friction lining about to be bent around the resin-coated convex face of the brake shoe by means of an overlying resilient spring steel band, as described more fully hereinafter.

The metal brake shoe 10 is inserted and located in the portable baking form 11 simply by inserting the two ends of its web portion 12 into corresponding slots 13 in the baking form and then laterally inserting pin 14 which passes thru hole 15 in web 12 of brake shoe 10. The flexible lining 20 is first bent around the convex surface 16 of brake shoe 10 and is then clamped tightly thereupon by means of the flexible spring steel band 25, which is hinged at pin 26 at one end and at its opposite end is hinged at pin 27 to handle 30. Handle 30 is forced down by hand when the parts are in the position shown in Fig. 3, until the two projecting lugs 31 thereon can be hooked under their cooperating projections 32. Handle 30 is then swung down from a substantial vertical position to the horizontal position shown in Figs. 4 and 5, during which swinging pin 27 is forced downwardly with a greatly multiplied force by the leverage action of lugs 31 fulcruming in their cooperating stationary notches 33, and this puts the desired high tension on steel band 25. Fitting 40, which supports hinge pin 26, is arranged to yield slightly in an upward direction due to the flattening out of the steel spring washer 41, which is shown in Fig. 4 as fully flattened out under the high tension in the steel band 25. Thus the spring washer 41 causes band 25 to maintain its high uniformly distributed pressure upon lining 20 during the later baking operation, as described herein. After the portable assembly shown in Figs. 4 and 5 is removed from the baking oven and allowed to cool, the handle 30 is swung up to release its lugs 31 from engagement with notches 33 and the steel band 25 is swung upwardly out of the way by pivoting on its hinge pin 26. Cross pin 14 is then removed whereupon the brake shoe 10 with the fully cured lining 20' permanently bonded thereto is simply lifted out of slots 13.

The moldable brake lining material used when practicing this invention may be any suitable compound formula having a substantial amount of a thermosetting resin as the main binder ingredient therein. Illustrative examples of compound formulas suitable for molding such friction linings are given below:

Compound No. 1

| | Pounds |
|---|---|
| Short asbestos fiber | 62 |
| Phenol-formaldehyde resin (in powder form) | 14 |
| Uncured rubber (crepe or smoked sheet) | 5 |
| Sulfur (in powder form) | 2.5 |
| Inert fillers (in powder form) | 11 |
| Heat-resisting friction powder (derived from cashew liquid, which is a high molecular weight phenol oil with an unsaturated side chain and obtainable from the outer shell of the cashew nut) | 5.5 |
| | 100.0 |

Gasoline (evaporated from compound prior to hot-molding) _____ gals__ 12.5

Compound No. 2

| | Pounds |
|---|---|
| Short asbestos fiber | 65 |
| Phenol-formaldehyde resin (in powder form) | 20 |
| Soft rubber dust | 5 |
| Barytes (in powder form) | 5 |
| Heat-resisting friction powder (derived from cashew liquid, as in Compound No. 1) | 5 |
| | 100 |

Compound No. 3

| | Pounds |
|---|---|
| Short asbestos fiber | 71 |
| Oil-modified thermosetting resin (in viscous liquid form) | 23 |
| Gilsonite (in powder form) | 2 |
| Barytes (in powder form) | 5 |
| Heat-resisting friction powder (derived from cashew liquid, as in Compound No. 1) | 8 |
| | 109 |

Petroleum naptha (evaporated from compound prior to hot-molding) _____ gals__ 6

According to this invention, I first provide a hot-molded but only partially cured piece of brake lining having the desired thickness and outline dimensions but molded in a straight flat form rather than in arcuate shape. Such a partially cured flat lining can be readily molded between the heated platens of a hydraulic press, and such molding is especially facilitated by first extruding a preform slab from the particular compound selected.

As an illustrative example, a method of making such partially cured flat slabs from Compound No. 1 (above) is given as follows. The ingredients of this compound are converted into a plastic mass in any well-known suitable manner. This plastic mass is then placed in an extruding machine and extruded thru a die into a continuous pliant slab whose width and thickness is determined as desired by the corresponding dimension of the aperture in the extrusion die. As this extruded slab passes from the extruding machine it is cut off into convenient lengths to facilitate handling and laid upon flat perforated metal supports and removed to a drying oven where the gasoline is slowly but completely evaporated therefrom. The drying oven temperature should not be so high as to cause any setting up of the thermosetting resin in the compound. The dried slabs come from the oven as self-retaining preforms, and preferably are given a preliminary densification by compressing same either in a hot press, cold press, or between pressure rolls, without subjecting the slabs to sufficient heat to cause any setting up of the thermosetting resin therein.

These uncured slabs, either with or without such preliminary densification, are then hot-molded between the heated platens of a hydraulic press under such pressure, temperature, and time period conditions as will cure the thermosetting resin only to a predetermined limited extent. The degree of cure should be sufficient to compact and set the compound at the desired final density, nevertheless the straight flat slabs should come from the press incompletely hardened and somewhat flexible and capable of being curved by force into the required final arcuate form and still subject to such further cure as will cause the material to inherently retain said arcuate form. Typical curing conditions to provide such desired degree of partial cure of a slab from which automobile brake linings are to be made are about 15 minutes at 280° F. with a pressure of 1300 lbs. per sq. in. on the material of the slab.

These partially cured flat slabs, after removal from the press, are cut up into pieces having the required length and width to form individual brake linings, and these pieces are preferably ground down to final thickness while still in flat form in order to facilitate such grinding. These partially cured individual linings are bonded to the individual metal brake shoes as follows:

The convex outer face of the brake shoe to which the lining is to be bonded is cleaned of all grease and preferably finely roughened as by shot-blasting or sand-blasting. This convex face is then coated, as by spraying or painting, with a very thin coating of a 50% solution of phenol-formaldehyde resin (in A stage) and alcohol. After the alcohol dries the adhering resin coating is preferably only about one-half to one thousandth of an inch thick. Next, the above-described partially cured flat brake lining is first warmed for several minutes to a temperature of about 275° F. to 300° F. to render it somewhat more flexible and is then bent around and clamped upon the resin-coated convex face of the brake shoe by means of an overlying resilient spring steel band. Such bending and clamping in place of the brake lining upon the brake shoe may be conveniently done in a specially designed portable baking form within which the brake shoe is properly located, and which form has the overlying resilient metal band arranged to be pulled down around the outer surface of the lining for bending the lining around the convex face of the brake shoe and further arranged to be very tightly clamped thereupon under a slightly yielding high tension. Thus the overlying highly tensioned steel band compresses the lining directly upon the coated face of the shoe and also provides such a yielding follow-up force thereupon as to maintain a high uniformly distributed pressure as the lining softens and becomes more flexible during the first part of the later baking operation.

The portable baking form, containing the lining thus clamped upon the brake shoe, is then baked in a baking oven to complete the cure of the thermosetting binder in the lining material and to simultaneously cure the quite thin resin coating lying between the lining and the metal surface. The temperature and time period of such final baking should be such as will further set up and cure the lining material in its final curved shape so that the lining will inherently retain its curved shape and not tend to spring back into its original straight shape.

Also during such final baking the uncured resin coating at first softens and so comes into a more intimate welding contact with the then only partially cured thermosetting binder in the lining, thus a more intimate and much stronger welded bond to the brake lining is obtained. The resin coating then quickly sets up and is cured simultaneously with the final curing of the lining material. Typical curing conditions for such final baking operation are three hours baking at 400° F., and under such pressure on the material as is readily obtainable by the above-described clamping of the flexible steel band thereupon. After such baking operation is completed the portable baking forms and contents are removed from the oven and allowed to cool before removing therefrom the brake shoes with the linings permanently bonded thereto. Laboratory tests show that the intimate bond between the lining and the metal surface is even stronger than the lining material itself, and show a shear strength of about 450 lbs. per sq. inch over the bonded area, as compared to about 170 lbs. per sq. inch for the same size brake lining riveted to the brake shoe according to usual practice.

In the above description there has been specifically described, as an illustrative example, one complete method of making partially cured flat pieces of friction lining which are suitable for use in carrying out this invention. It is to be understood, of course, that similar partially cured flat pieces may be made by other methods and from other compounds, such as Compounds Nos. 2 or 3 above. The necessary characteristics of such partially cured flat pieces of brake linings to be used with this invention will be very clear from the above description. For instance, such partially cured flat pieces of brake linings may be made according to the disclosures in a co-pending application, Ser. No. 508,952, filed Nov. 4, 1943, now Patent No. 2,379,166, issued June 26, 1945, which is owned by the assignee of this application.

While the specific methods of the present invention as herein disclosed, constitute preferred methods, it is to be understood that those skilled in the art may vary therefrom in various respects without departing from the principles of this invention as defined by the claims which follow.

What is claimed is as follows:

1. The steps in the method of making a heat-resisting fibrous friction lining so bonded to a metal brake shoe as to withstand the high temperatures encountered in automobile brakes, comprising: molding into slab form a fibrous compound having a thermosetting resin binder and preliminarily curing said slab to such predetermined and accurately-controlled degree as will compact and permanently set said slab at the desired final thickness of the finished lining yet leave said slab still susceptible to such further degree of cure as will materially increase its hardness and rigidity after it has been later bent to its final shape, bending said flexible partially-cured slab to its final shape and clamping same with a uniformly distributed pressure upon the convex face of a metal brake shoe, said convex face having been previously coated with a thin dry coating of thermosetting resin in the A-stage of cure, then baking this clamped assembly to complete the final cure of said lining while clamped in situ and simultaneously integrate said thin resin coating with the binder resin in said lining while the curing of said coating proceeds from its A-stage of cure.

2. The steps in the method of making a heat-resisting fibrous friction lining so bonded to a metal brake shoe as to withstand the high temperatures encountered in automobile brakes, comprising: molding under heat and pressure a fibrous friction compound having a thermosetting resin as the main binder therein into a straight slab and thereby provide a molded flexible lining blank whose degree of cure is sufficient to cause it to inherently retain its molded thickness nevertheless leaving said blank still susceptible to a further chemical curing reaction which will greatly increase its hardness and rigidity, coating the convex face of a metal brake shoe with a thin dry coating of a thermosetting resin in the A-stage of cure and possessing an inherent bonding affinity with said thermosetting binder in the lining compound, then bending said partially-cured flexible blank and clamping same with a uniformly distributed pressure on the resin-coated convex face of the brake shoe and thereby conform said flexible blank to said convex face, then baking this assembly to materially increase the hardness and rigidity of the lining and simultaneously integrate said resin coating with the main binder resin in the lining while the curing of said resin coating proceeds from its A-stage of cure.

3. The steps in the method of making a heat-resisting fibrous friction lining so bonded to a metal brake shoe as to withstand the high temperatures encountered in automobile brakes, comprising: preliminarily molding under heat and pressure a high-temperature-resisting friction compound having a phenol-formaldehyde resin as the main binder therein and thereby provide a partially-cured lining blank having the desired final thickness and density but cured only to that stage of cure which will set up the resin binder sufficiently to cause said blank to inherently retain said final thickness and density but leave it somewhat flexible, coating the curved metal face of a brake shoe with a dry thin coating of phenol-formaldehyde resin in the A-stage of cure, bending and clamping said flexible lining blank directly upon the resin-coated curved surface of the brake shoe with a uniformly distributed pressure, then baking this clamped assembly to complete the cure of the lining while it is exactly conformed to said resin-coated surface and simultaneously integrate said thin resin coating therewith while said coating is being cured from its A-stage of cure.

4. The steps in the method of making a heat-resisting fibrous friction lining bonded to a supporting metal surface in such manner as to withstand high temperatures, comprising: preliminarily molding under heat and pressure a heat-resisting fibrous friction compound having a phenol-formaldehyde resin binder so as to provide a lining blank having the final thickness and density desired in the final lining but which blank is still subject to a further degree of cure which will very materially increase its hardness and rigidity, coating the supporting metal surface to which said friction lining is to be bonded with a thin dry coating of phenol-formaldehyde resin in the A-stage of cure so that when heat and pressure is applied thereto it will first soften and flow but then permanently set and harden, bending and clamping said lining blank in direct conformity with said resin-coated metal surface, then baking this clamped-together assembly to materially increase the hardness and rigidity of the friction lining and simultaneously cause said resin coating to first soften and flow into an intimate bonding relationship with said lining and then permanently set and harden.

5. The steps in the method of making a heat-resisting fibrous friction lining so bonded to a metal brake shoe as to withstand the high temperatures encountered in automobile brakes, comprising: preliminarily molding under heat and pressure a heat-resisting fibrous friction compound having a phenol-formaldehyde resin binder therein and thereby provide a partially-cured lining blank which is relatively soft and flexible when compared to the hardness and rigidity of the final brake lining, coating the curved metal surface of the brake shoe to which said lining blank is to be bonded with a thin dry coating of phenol-formaldehyde resin in the A-stage of cure, bending said partially-cured lining blank to exact conformation with said resin-coated curved metal surface and clamping said lining blank thereupon, then baking this clamped-together assembly to materially increase the hardness and rigidity of said lining while it is pressed into exact conformation with said surface and thereby cause it to inherently retain its exact final shape and simultaneously integrate said resin coating therewith while said coating is being cured from its A-stage of cure.

6. The steps in the method of making and bonding a friction lining to a cylindric supporting metal surface, comprising: molding and only partially curing a thermosetting friction compound into a straight slab having such a degree of cure as will substantially determine the thickness and density of the final lining but will permit said slab to be bent into cylindric shape without changing its cross section, bending said partially cured slab into its final cylindric shape and clamping same against said cylindric metal surface with an intervening layer of thermosetting resin therebetween, then baking this clamped assembly to complete the cure of said lining and thereby cause it to inherently retain its final cylindric shape and simultaneously bond same to said cylindric metal surface.

HEDLEY R. DREHER.

REFERENCES CITED

The following references are of record in the file of this patent:

UNITED STATES PATENTS

| Number | Name | Date |
|---|---|---|
| 1,616,659 | Heany | Feb. 8, 1927 |
| 1,682,319 | Bluhm | Aug. 28, 1928 |
| 1,809,984 | Mains | June 16, 1931 |
| 1,923,462 | Stoner | Aug. 22, 1933 |
| 2,003,752 | Landt | June 4, 1935 |
| 2,009,207 | Rosner | July 23, 1935 |
| 2,059,576 | Glick | Nov. 3, 1936 |
| 2,272,532 | Shriver | Feb. 10, 1942 |
| 2,333,453 | Tilden | Nov. 2, 1943 |
| 2,426,421 | Tilden et al. | Aug. 26, 1947 |